United States Patent [19]
Gabel et al.

[11] 3,747,859
[45] July 24, 1973

[54] TORCH FOR THERMOCHEMICAL PROCESSING OF WORK PIECES

[75] Inventors: Heinz Gabel; Gerhardt Lange, both of Frankfurt/Main, Germany

[73] Assignee: Messer Griesheim GmbH, Frankfurt/Main, Germany

[22] Filed: Sept. 13, 1971

[21] Appl. No.: 179,993

[30] Foreign Application Priority Data
Sept. 19, 1970 Germany.................. P 20 46 415.7

[52] U.S. Cl.................. 239/418, 239/424, 239/601
[51] Int. Cl..... F23d 11/12, F23d 15/00, B05b 7/06
[58] Field of Search.................. 239/418, 419, 419.3, 239/423, 424, 424.5, 601

[56] References Cited
UNITED STATES PATENTS
2,764,230  9/1956  Richter.................... 239/419 X
1,861,760  6/1932  Spigelmire et al........... 239/424.5 X
470,711  3/1892  Siemens..................... 239/418 X
1,958,044  5/1934  Hendricks.................. 239/414.5 X
2,343,958  3/1944  Crowe...................... 239/424.5 X
2,829,709  4/1958  Mathews.................... 239/419 X FOREIGN PATENTS OR APPLICATIONS
520,205  6/1953  Belgium.................... 239/424.5

Primary Examiner—Robert S. Ward, Jr.
Attorney—Connolly and Hutz

[57] ABSTRACT

A torch for the thermochemical processing of work pieces has at least one channel for the processing oxygen and at least one channel for the fuel gas and heating oxygen mixture-components in the form of separate channels for the components or a single channel for the mixture. The processing oxygen channel has a depression at its outlet with the depression being at an angle of 90°–150° and preferably 120°.

10 Claims, 1 Drawing Figure

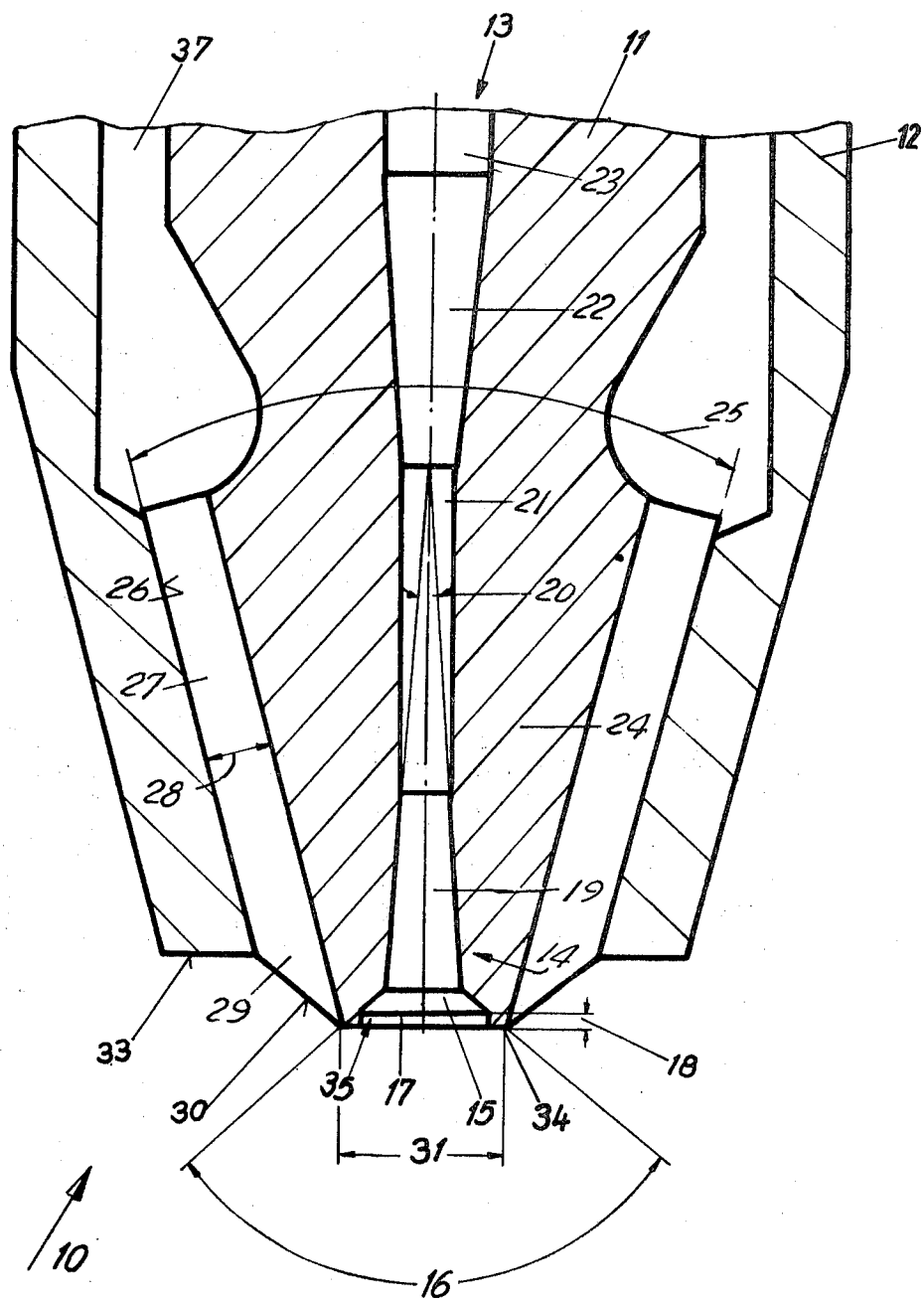

TORCH FOR THERMOCHEMICAL PROCESSING OF WORK PIECES

BACKGROUND OF INVENTION

This invention relates to a torch for the thermochemical processing of metal work pieces having at least one channel for the processing oxygen and at least one channel for a fuel gas heating oxygen mixture or with channels for the separate supply of fuel gas and heating oxygen.

The object of the invention is to provide a torch by means of which higher cutting speeds may be achieved while maintaining an optimum cutting surface quality with reference to cutting groove follow-up, cutting groove depth, evenness of cutting surface, notching edges and low slag adhesion at the underside of the torch cut.

SUMMARY OF INVENTION

As a solution to this problem it is suggested according to the invention that the channel for the processing oxygen have a depression at the outlet and that the angle of the depression be about 90°–150°, and preferably about 120°.

THE DRAWING

The single FIGURE illustrates the tip of the inventive torch used for work piece thicknesses of up to 100 mm.

DETAILED DESCRIPTION

In the following table are given some cutting data, which had been achieved by means of the novel torch (column I). In addition, there are given in the table cutting data which had been achieved with a known powerful torch (column II).

Because of the inventive suggestion, it is possible to increase the cutting speed by more than 20 percent, and despite this, the cut has an optimum quality.

An explanation of this occurrence is that because of the processing oxygen being discharged at great speed in the area of the depression, there results a vacuum, so that the fuel-gas heating oxygen mixture — hereinafter referred to as the "mixture" — is sucked in in this area (injection effect) and already inside the torch envelops and enriches the oxygen jet, and thus its jacket, with combustible gases.

With the emitted processing oxygen jet, the enriched jacket zone is discharged from the torch. In this connection, during the emission there takes place in this zone a more complete combustion of the combustible gases with portion of the processing oxygen, and the jacket zone becomes hotter as a result. This hot zone increases the heat supply in the reaction point. Furthermore, a focusing or tapering of the oxygen jet is achieved along its entire length, caused by the expansion of the hot gas jacket resulting in the combustion, which also effects the direction of the oxygen jet. Thereby the oxygen supply per surface unit remains substantially constant along the length of the jet. Of particular advantage is the reduction of the cutting groove follow-up resulting thereby.

This hot jacket zone allows, as experiments have shown, a greater distance of the torch from the work piece surface, and the torch is furthermore less sensitive to distance changes with the cutting surface quality remaining the same.

According to a further suggestion of the invention, the channel for the processing oxygen, viewed against the direction of flow, is formed conically behind the novel depression, the cone angle being about 6°. By this construction, the expansion of the processing oxygen is supported and a nearly laminar flow of the oxygen jet is achieved.

For an improvement of the stated injection effect, it is suggested according to the invention that the depression, viewed in the direction of flow, end in a cylindrical outlet, the length of the cylindrical outlet being about 0.1 – 1 mm, and preferably 0.3 mm.

In a further development of the invention it is proposed to provide a torch consisting of a cutting nozzle body with a nozzle cap around the nozzle body. The front surface of the nozzle cap is recessed with respect to the front surface of the cutting nozzle body. This feature is particularly advantageous with respect to safeguarding against back firing of the torch.

Referring now to the drawing the novel torch 10 consists of a cutting nozzle or nozzle body 11, made of copper, and a copper nozzle cap 12 slipped thereover. The cutting nozzle 11 has a centrally disposed channel 13 for the operative cutting oxygen.

This channel has a depression 15 at its outlet 14; the depression angle 16 is about 90°–150°, preferably 120°. Adjoining the depression 15 there is, viewed in the direction of the oxygen flow a cylindrical recess 17. The Material: St 37
Fuel Gas: Acetylene (values in parentheses are for propane, illuminating gas, natural gas)
Temperature: Room Temperature
Oxygen for Cutting: 99.5% Pure

| Thickness of sheet/ mm | Cutting Speed mm/min. | | Cutting Nozzle bore/mm | | Cutting Oxygen Supply Pressure Atmospheres Absolute Pressure | | Fuel Gas Supply Pressure Atmospheres Absol. Press. | | Torch Distance from work piece/mm | | Heating Oxygen Press. Atmosp. Press. | | Cutting quality German Indust. Norm 2310 | |
|---|---|---|---|---|---|---|---|---|---|---|---|---|---|---|
| | I | II | I | II | I | II | I | II | I | II | I | II | I | II |
| 10 | 750 | 600 | 0.9 | 0.95 | 6–8 | 3.0 | | | | | | | | |
| | (660) | (550) | (0.9) | (0.95) | (6–8) | (3.0) | | | | | | | | |
| 20 | 550 | 450 | 1.0 | 1.1 | 6–8 | 3.5 | | | | | | | | |
| | (530) | (440) | (1.0) | (1.1) | (6–8) | (3.5) | | | | | | | | |
| 30 | 460 | 380 | 1.0 | 1.15 | 6–8 | 4.5 | | | | | | | | |
| | (450) | (370) | (1.0) | (1.15) | (6–8) | (4.5) | | | | | | | | |
| 40 | 420 | 340 | 1.15 | 1.4 | 6–8 | 4.0 | | | | | | | | |
| | (420) | (340) | (1.15) | (1.4) | (6–8) | (4.0) | | | | | | | | |
| 50 | 390 | 320 | 1.15 | 1.4 | 6–8 | 4.5 | 0.02–1.5 | | 10–25 | | 3–7 | 1–5 | Quality I | |
| | (390) | (320) | (1.15) | (1.4) | (6–8) | (4.5) | (0.1–1.5) | | (10–25) | | (3–7) | (1–5) | Quality I | |
| 80 | 340 | 280 | 1.4 | 1.8 | 6–8 | 5.5 | | | | | | | | |
| | (340) | (280) | (1.4) | (1.8) | (6–8) | (5.5) | | | | | | | | |
| 100 | 310 | 260 | 1.4 | 1.8 | 6–8 | 6.0 | | | | | | | | |
| | (310) | (260) | (1.4) | (1.8) | (6–8) | (6.0) | | | | | | | | | length 18 of the cylindrical recess 17 is 0.1–1 mm, preferably 0.3 mm and its diameter is about 2.5 mm.

Viewed against the flow direction and behind the depression 15, the area 19 of the cutting channel 14 has a conical shape, the cone angle 20 measuring about 6°. This conical part 19 continues cylindrically into part 20 which has the narrowest cross section of the cutting oxygen channel. The cylindrical part 21 is again connected via a conically enlarged intermediate part 22 to the feeding channel 23 which has a larger diameter and feeds oxygen at a pressure amounting to about 6-8 abs. at. at the narrowest part 21 of the cutting channel 14. Cuts of good quality are also obtainable at pressures as low as 1.5 abs. at., but in this case the cutting speed is below that shown in the table.

The terminal part 24 of the cutting nozzle body 11 has a conical exterior shape whose angle 25 measures about 25°-30°. This terminal part 24 attaches by a tapered bore 26 to the nozzle cap 12 at an identical cone angle. The exterior wall of the end part 24 has slits 27 which are partly covered by the nozzle cap 12. The slits 27 have a depth 28 of about 1.3 mm and the width is 0.2-0.4, preferably 0.3 mm. At the terminal part 29 of the slits 27, the cutting nozzle body 11 has a bevelled portion 30 of about 50°, the bevel ending at the circumference of the bottom circle 31 of the slits 27. The diameter of the bottom circle 31 measures about 2.8 mm. The dimension featured for the slits according to the invention remains the same for all fuel gases up to cutting thicknesses of about 100 mm.

The frontal surface 33 of the nozzle cap 12 is set back with respect to the frontal surface 34 of the cutting nozzle. In the illustration the nozzle cap 12 has been recessed so that the bevel 30 starts at the level of the frontal surface 33 of the nozzle cap 12.

In the torch build according to the invention, the mixture exits from the torch via the conduit 37 and the slits 27 and, because of the low pressure present in the region 35 of the depression 15, it is sucked into this region.

The torch built according to the invention can be used with fuel gases such as acetylene, propane, natural gas, illuminating gas or methane, but will also operate with other known fuel gases without any canges required in the cutting nozzle and at unchanged values of the mixture system.

The torch according to the invention will permit application of higher cutting speeds while the quality of the cut surface remains unchanged. The torch can be applied for a wide range of metal thicknesses, preferably for those of 3-100 mm.

The invention has been described above with respect to the use of a fuel gas - heating oxygen mixture supplied to the processing oxygen jet. The invention equally encompasses, however, the separate supply of the mixture components of fuel gas and heating oxygen to the processing oxygen jet, the separate supply being effected through annular channels or openings. Thus the term "mixture component channel means" refers to either at least one channel for conveying a mixture of the components or individual channels for the individual components.

What is claimed is:

1. In a torch for the thermochemical processing of work pieces comprising a nozzle having at least one channel for the processing gas, and mixture component channel means in said nozzle, the improvement being a depression at the outlet of said processing gas channel, said depression being at an angle of about 120°, said depression viewed in the direction of flow ending in a cylindrical outlet, and the length of said cylindrical outlet being about 0.1 to 1 mm.

2. In the torch of claim 1 wherein said channel for the processing oxygen, viewed counter the flow direction, is formed conically upstream from said depression, and the cone angle being about 6°.

3. In the torch of claim 1 wherein the length of said cylindrical outlet is 0.3 mm.

4. In the torch of claim 1 wherein said nozzle includes a nozzle body and a nozzle cap slipped thereover, and the frontal surface of said cap being recessed with respect to the frontal surface of said body.

5. In the torch of claim 4 wherein said component channel means comprises slits in the exterior wall of said nozzle body, and said slits being partially covered by said cap.

6. In the torch of claim 5 wherein said slits have a depth of about 1.3 mm and a width of 0.2 to 0.4 mm.

7. In the torch of claim 6 wherein said slits have a width of 0.3 mm.

8. In the torch of claim 6 wherein said nozzle body and the surrounding conical bore of said cap are conically constructed, and the cone angle being 25° to 30°.

9. In the torch of claim 5 wherein said nozzle body is bevelled at the outlet of said slits, the bevel being of about 50° and ending at the circumference of the circle formed by the bases of the slits.

10. In the torch of claim 9 wherein the bevel is disposed at the same level as the frontal part of said recessed nozzle cap.

* * * * *